US011658822B1

(12) United States Patent
Engers et al.

(10) Patent No.: US 11,658,822 B1
(45) Date of Patent: May 23, 2023

(54) DYNAMIC CROSS ORIGIN RESOURCE CONTROL

(71) Applicant: Twitch Interactive, Inc., San Francisco, CA (US)

(72) Inventors: Ross Engers, Seattle, WA (US); Kai Hayashi, Seattle, WA (US)

(73) Assignee: Twitch Interactive, Inc., San Francisco, CA (US)

( * ) Notice: Subject to any disclaimer, the term of this patent is extended or adjusted under 35 U.S.C. 154(b) by 375 days.

(21) Appl. No.: 16/795,423

(22) Filed: Feb. 19, 2020

(51) Int. Cl.
*H04L 9/32* (2006.01)
*H04L 9/08* (2006.01)
*H04L 9/30* (2006.01)
*H04L 65/61* (2022.01)
*H04L 67/306* (2022.01)

(52) U.S. Cl.
CPC ............ *H04L 9/3213* (2013.01); *H04L 9/088* (2013.01); *H04L 9/30* (2013.01); *H04L 65/61* (2022.05); *H04L 67/306* (2013.01)

(58) Field of Classification Search
CPC ......... H04L 9/3213; H04L 9/088; H04L 9/30; H04L 65/4069; H04L 67/306
See application file for complete search history.

(56) References Cited

U.S. PATENT DOCUMENTS

| | | | |
|---|---|---|---|
| 10,326,746 B1 * | 6/2019 | Rathbone | H04L 63/062 |
| 10,664,615 B1 * | 5/2020 | Schenkein | H04L 67/02 |
| 11,063,930 B1 * | 7/2021 | Bose | G06F 16/951 |
| 2004/0128499 A1 * | 7/2004 | Peterka | H04L 63/0807 713/155 |
| 2005/0204148 A1 * | 9/2005 | Mayo | H04L 63/0815 713/185 |
| 2011/0283359 A1 * | 11/2011 | Prince | H04L 63/0245 726/23 |
| 2012/0002654 A1 * | 1/2012 | Pekkala | H04L 63/0428 370/338 |
| 2013/0125223 A1 * | 5/2013 | Sorotokin | H04L 9/3213 726/6 |
| 2014/0115724 A1 * | 4/2014 | van Brandenburg | G06F 21/10 726/30 |
| 2016/0294548 A1 * | 10/2016 | Qian | H04L 63/102 |
| 2019/0334884 A1 * | 10/2019 | Ross | G06F 21/41 |
| 2021/0243177 A1 * | 8/2021 | Burson | H04W 12/06 |

* cited by examiner

*Primary Examiner* — Darren B Schwartz
(74) *Attorney, Agent, or Firm* — BakerHostetler

(57) ABSTRACT

Example methods and system for providing content are disclosed. One or more cryptographic keys may be generated. At least a portion of the one or more cryptographic keys may be used to generate a token associated with a user interface service. The token may indicate a valid origin domain. The token may be provided to a user device, which may use the token to request content from a content service. The content service may authorize the request based on a comparison of the valid origin domain and an origin identifier associated with the request.

17 Claims, 6 Drawing Sheets

DYNAMIC CROSS ORIGIN RESOURCE CONTROL

BACKGROUND

A cross-origin request occurs when a web page attempts to request a resource outside of the domain on which the website is hosted. Such requests may be used by malicious coding to compromise a computer. Under the same origin policy a web browser is prevented from accessing data using cross-origin requests. However, the same origin policy may be too restrictive for current applications. Thus, there is a need for more sophisticated and flexible approaches to managing cross-origin requests.

BRIEF DESCRIPTION OF DRAWINGS

The following detailed description may be better understood when read in conjunction with the appended drawings. For the purposes of illustration, there are shown in the drawings example embodiments of various aspects of the disclosure; however, the invention is not limited to the specific methods and instrumentalities disclosed.

DETAILED DESCRIPTION

The disclosed methods and systems disclose a novel approach to management of cross-origin requests. The disclosed approach allows for a first entity to host content, while a second entity provides services that direct users to the content. The second entity may have control over which domains can be used to originate requests for content. For example, the second entity may host one or more websites (e.g., or other user interfaces) that provide a way for users to request access to content. The second entity may desire to prevent other websites from accessing the content. The second entity may generate a token, such as a cryptographically processed (e.g., an encrypted token, a signed token, cryptographically signed), indicating a valid origin domain for a request for content. The token may be provided to a user. The user may use the token to request content. The second entity may change the valid origin domain at any time by changing the valid origin domain and issuing a new token to the user. The disclosed approach is an improvement over conventional techniques. The approach is more flexible allowing content managers to control which content is accessible from which domains. The disclosed approach is also more secure than conventional approaches, which may rely on less security to allow greater flexibility.

Figure 1:
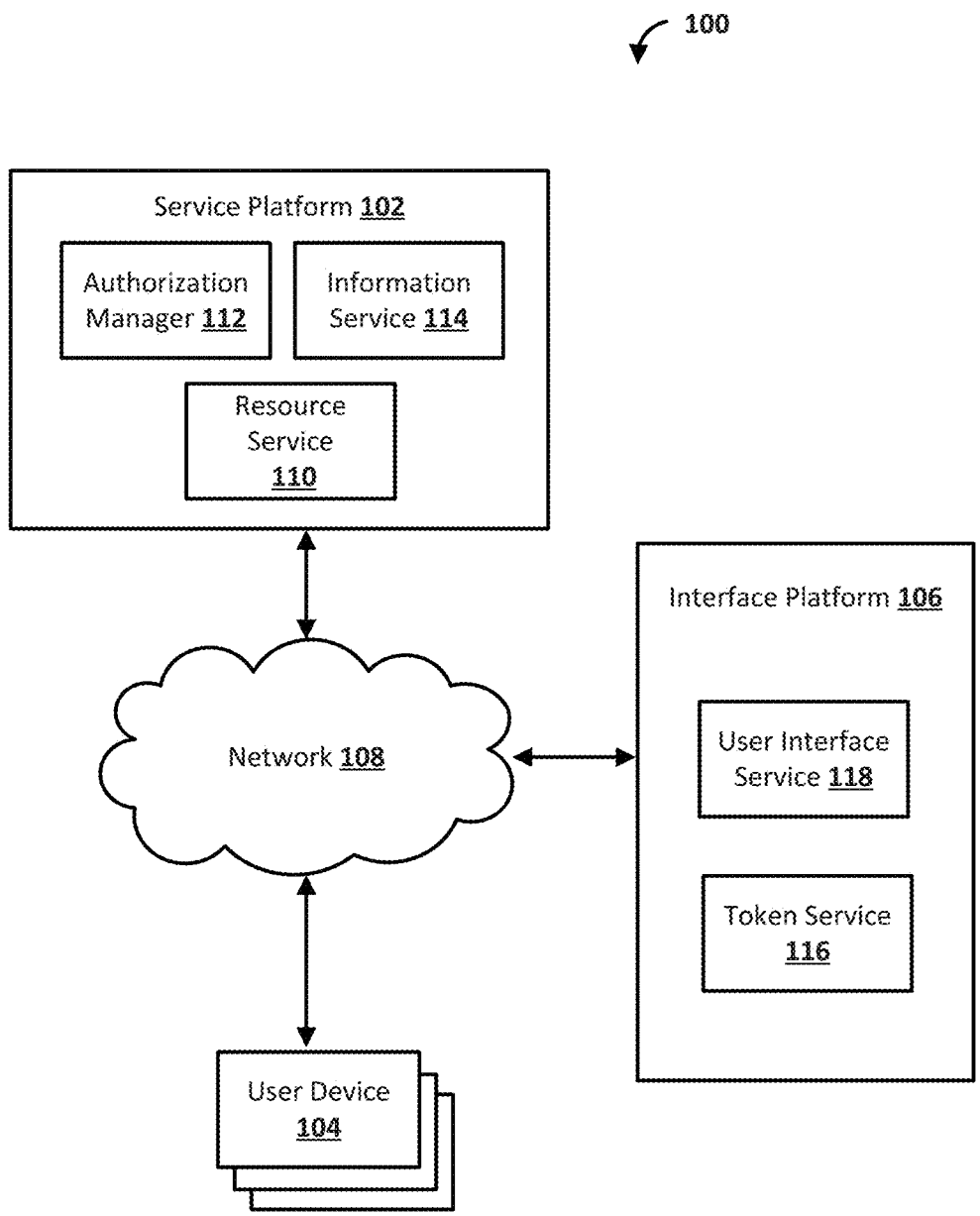
FIG. 1 is a diagram showing an example system for providing content services.

FIG. 1 is a diagram illustrating an example system 100 for providing content services. The system may comprise a service platform 102. The service platform 102 may comprise one or more computing nodes (e.g., servers, virtual machines, computing devices) associated with providing one or more services. Example services may comprise storage services, computing services, hosting services, content services, and/or the like. The service platform 102 may comprise a web-based platform. The service platform 102 may be configured to allow users to establish accounts, manage settings, activate/deactivate services, change parameters for services, and/or the like via a web-based interface, an application programming interface, and/or the like.

The service platform 102 may be configured to communicate with one or more user devices 104, one or more devices of an interface platform 106, and/or the like. The system 100 may comprise a network 108. The network 108 may be configured to communicatively couple one or more of the service platform 102, the one or more user devices 104, the interface platform 106, and/or the like. The network 108 may comprise a plurality of network devices, such as routers, switches, access points, switches, hubs, repeaters, modems, gateways, and/or the like. The network 108 may comprise wireless links, wired links, a combination thereof, and/or the like.

The service platform 102 may be configured to provide the one or more services using one or more resource services 110. The one or more resource services 110 may comprise a storage service, processing services, web hosting services, or combination thereof. The one or more resource services 110 may comprise a content service. The content service may host content, such as video, audio, images, applications, streaming, or a combination thereof. The content service may provide a content distribution network as a service. A plurality of computing nodes may store the content at one or more locations. The one or more locations may be geographically distributed. The one or more locations may redundantly store the content. The content service may comprise a plurality of edge servers that distribute content in different geographic locations.

The service platform 102 may comprise an authorization manager 112. The authorization manager 112 may be configured to generate authorization information. The authorization information may comprise one or more cryptographic keys. The one or more cryptographic keys may comprise a cryptographic key-pair, such as a public key and/or a private key. The authorization manager 112 may generate the authorization information based on a request. The request may be associated with the interface platform 106. The device associated with the interface platform 106 may send the request to the authorization manager 112. The request may be received through an application programming interface, a web page, or a combination thereof. The authorization manager 112 may be configured to send the private key to the device associated with the interface platform (e.g. in response to the request).

The authorization manager 112 may cause the one or more cryptographic keys (e.g., the public key) to be stored. At least a portion of the one or more cryptographic keys (e.g., the public key) may be stored by the service platform 102. The one or more cryptographic keys may be associated with content, an account, or a combination thereof. Different accounts may have different corresponding cryptographic keys stored and/or associated with corresponding content.

The service platform 102 may comprise an information service 114. The information service 114 may be configured to provide access to the content. The information service may indicate locations of the content. The information service 114 may store one or more indexes associated with content. The information service 114 may comprise a manifest service configured to provide manifests associated with content. An example manifest may comprise an index identifying a plurality of segments of content and corresponding locations for accessing the segments of content. The information service 114 may receive a request for information associated with accessing content. The requested information may comprise an index, a manifest, location information, or a combination thereof.

The information service 114 may authorize the request for information. The information service 114 may authorize the request based on the one or more cryptographic keys, such as the public key. The information service 114 may process (e.g., cryptographically process, decrypt, validate) data (e.g., encrypted data, signed data, data in cryptographically processed data structure) received with the request. The information service 114 may be configured to use one or more stored cryptographic keys (e.g., stored by the service platform 102) to process (e.g., validate, decrypt) the data. The content identified in the request may be associated (e.g., by the authorization manger) with the content and/or an account associated with the content. The information service 114 may determine the corresponding one more cryptographic keys to use based on the association.

The data make comprise a token, such as a cryptographic token. The token may comprise one or more data fields. The one or more data fields may comprise an origin field. The origin field may comprise data indicative of a valid origin domain. The valid origin domain may indicate one or more domains that are authorized (e.g., or valid) for originating requests for the content. The request may comprise an origin identifier indicating a domain associated with originating the request. The origin identifier may be stored in a header of the request. The origin identifier may be stored in an origin field in the header of the request. The origin identifier may be added (e.g., automatically, without user instruction to add it) to the request by a content browser (e.g., web browser). The token may be stored in the payload of the request. The information service 114 may compare the origin identifier to the data indicative of the valid origin domain (e.g., determined from the token). If the origin identifier matches the data indicative of a valid origin domain, then the request may be authorized. As an example, if the origin identifier comprises myvideosite.com and the determined data indicative of a valid origin domain comprise myvideosite.com, then the request may be authorized.

The information service 114 may also perform one or more other checks before authorizing a request, such as verifying that the token is not expired. Any field associated with validation, checking, and/or the like may be validated. A content quality field may be validated. The content quality field may comprise a resolution of content, such as 1080p, 720p, 480p, HD, UHD, 4 k, SD, and/or the like. The content quality field may be validated by determining if the requested resource (e.g., or content) has at least the resolution indicated in the content quality field. If the requested resource is determined to have at least the resolution indicated, then the request can be processed (e.g., by providing the requested resource). If the requested resource is determined to have less than the resolution indicated, the request can be denied, and/or the request may be redirected to a different version of the resource associated the indicated resolution.

A permissions field may be validated, checked, accessed and/or otherwise determined. The permissions field may indicate a permission level, such as read, write, create delete, and/or the like. The request may comprise a request to perform an operation associated with a permission level. If the permission field indicates a permission level sufficient to perform the operation, then the operation may be applied. For example, if the operation is to write or open a file (e.g., document) for editing, the permission field can be accessed to determine if the permission level comprises write. If the permission level matches, then the request may be processed. If the permission level is another level, such as read, then the request may be denied and/or the request can be forwarded to provide the requested resource according to the permission level indicated.

A resource type field may be validated, checked, accessed, and/or otherwise determined. The resource type field may indicate a type of resource, such as audio, video, file container type, document type (e.g., pdf, docx, rtf), and/or the like. If the resource type field matches the type of resource being requested, then the request can be processed. If the resource type field does not match the type of resource being requested, then the request can be denied and/or the user can be forwarded to a different resource that matches the type of resource.

The origin field may comprise multiple valid origin domains. The origin field may comprise an array of valid origin domains. As an example, the origin field may comprise an array, such as "[*.exampleapp.com, *.examplesite.com]." This may indicate that only requests with origin identifiers comprising exampleapp.com or examplesite.com may be valid. If a request is received. The token received with the request may be processed to determine the array of valid origin domain. The origin identifier in the header of the request can be compared to each valid domain origin (e.g., or until a match is found).

A valid origin domain in the domain field may indicate a subdomain. If a subdomain is indicated, only requests from the subdomain may be authorized. For example, the origin field may comprise "[secure.exampleapp.com, extrasecure.exampleapp.com," indicating that requests may only be authorized if they have an origin identifier indicating the subdomain of secure.exampleapp.com or extrasecure.exampleapp.com. The subdomain may have additional security restrictions that are not applied to the domain (e.g., exampleapp.com) or other subdomains.

The interface platform 106 may comprise a token service 116 configured to generate one or more tokens. An example token may comprise a cryptographic token, such as a JSON web token. A token may comprise one or more data fields that are encrypted and/or cryptographically signed by one or more cryptographic keys, such as a private key received from the authorization manager. The one or more data fields may comprise in origin field, content identification information, user specific data, expiration information, or a combination thereof. The origin field may indicate one or more origin domains authorized (e.g., by the interface platform 106) for accessing content. The content identification information may comprise channel information. The user specific data may comprise location information, user device information, and/or the like that may be used to process a specific user's future requests for content. The token may indicate a type of encryption used, a cryptographic algorithm used, and/or other information.

The token service 116 may generate tokens on a per user basis. A first token may be generated for a first user (e.g., of a user interface, application, or web page). A second token may be generated for a second user (e.g., of a user interface, application, or web page). The first token and the second token may both be processed (e.g., cryptographically processed, generated, signed, encrypted) using the same cryptographic key. In some implementations, different cryptographic keys may be used for each token. The first token may have the same or different data in the origin field than the origin field of the second token. The first user may be a user of a first user interface accessed via a first domain. The second user may be a user of a second user interface access via a second domain different than the first domain. The origin field of the first token may comprise the first domain. The origin field of the second token may comprise the second domain.

The interface platform 106 may comprise a user interface service 118. The user interface service 118 may be implemented as a web server (e.g., one or more computing nodes that processes requests based on hypertext transfer protocol). The web server may provide web pages for accessing content. The user interface service 118 may provide data associated with one or more user interfaces. The data may be provided to the one or more user devices 104. A user interface may comprise a website, application (e.g., mobile device application, streaming device application), and/or the like. The data associated with one or more user interfaces may be rendered by a browser, content application, and/or the like for viewing by a user. The user interface may comprise or more links to access content, a content player, or a combination thereof. The user interface may comprise computer executable code, such as scripting language, configured to cause a request to be sent to access content selected by user. The content may be represented as a content tile, link, and/or other interface element. The computer executable code may trigger an asynchronous request, such as an asynchronous JavaScript and XML (AJAX) request. The request may comprise a hypertext transfer protocol based request for content. The request may be sent to the service platform 102, such as the information service, the content service, the resource service, and/or the like.

The one or more user devices 104 may comprise a computing device, such as mobile device, smart devices (e.g., smart watch, smart glasses, smart phone), a computing station, a laptop, a tablet device, and/or the like. The one or more user devices 104 may be configured to output one or more user interfaces, such as a user interface associated with the interface platform 106, the user interface service 118 and/or the like.

The system 100 may be configured to implement a data analytics service. A customer may provide content to users (e.g., via the interface platform 106). The token service 116 may send a token to a user device 104. The user device (e.g., or content browser thereof) may be configured to send a message to the service platform 102 based on a browser event. A browser event may comprise, selection of a user interface element, a mouse event, expiration of timer, focus on an area of a content page, an asynchronous request event (e.g., scripting language enabled request), a scripting event, a document object model event, navigation event (e.g., pausing, playing, stopping, fast forwarding, rewinding, scrolling), a combination thereof, and/or the like. The message may comprise an indication of the browser event. The message may comprise the provided token. Each time a browser event occurs, a message with the token and the corresponding browser event may be sent to the service platform 102. The customers could then use the origin field in the token to ensure only events from certain website domains are considered valid via cross origin resource sharing. Messages including browser events may be validated using the token (e.g., using any validation process herein). If the browser event is validated, it may be stored and/or otherwise be used to augment data, such as browser analytics data. The events and/or browser analytics data may be accessed (e.g., via a dashboard, email, etc.) by the customer.

The system 100 may be used to implement other services, such as a video hosting service, an audio service, a document service (e.g., cloud based document service, document editing, storage, collaboration). In such implementations, data (e.g., events, media, content, documents) may be provided to and/or requested from the service platform 102. A token accompanying the request may be used to validate any messages and/or requests. In each case, the token may have data that is inserted by the token service 116 of the interface platform 106. The data in the token may be dynamically selected based on a variety of factors such as, context, demographics, subscriber level, and/or the like.

Figure 2:
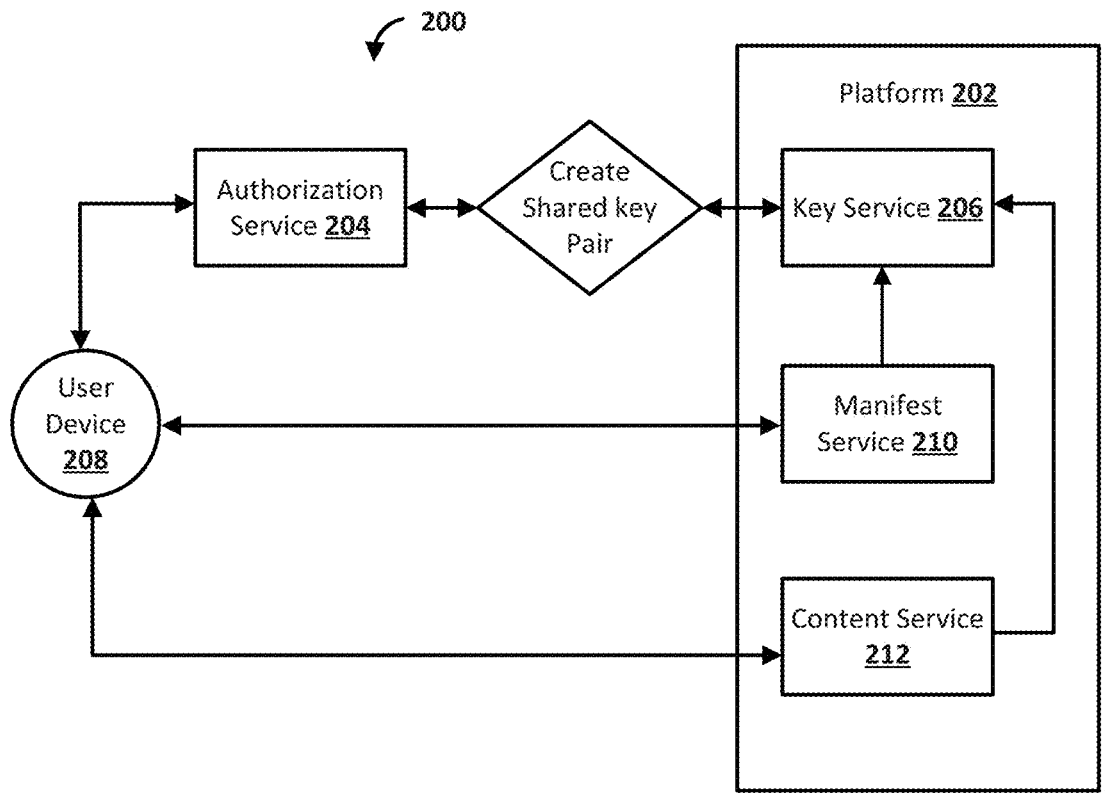
FIG. 2 is a diagram showing another example system for providing content services.

FIG. 2 is a diagram showing another example system 200 for providing content services. The disclosure may be implemented as system that allows customers that would like to provide content to users to subscribe to a content distribution network as service. The system 200 may be configured for control cross origin resource sharing (CORS) enforcement for the content distribution network (e.g., Video CDN). CORS enforcement may be based on a token, such as a JSON web token, that relies on a public/private key pair.

A customer may subscribe to a content hosting service (e.g., video hosting service) of a platform (e.g., the service platform 102 of FIG. 1) 202. The platform 202 may comprise one or more nodes at one or more geographic locations for serving videos, video stream, and/or other content. The customer may store the videos and/or other content in storage maintained by the platform 202. The customer (e.g., or a device associated with the customer) may send a request to the platform 202 to generate one or more cryptographic keys. The customer may manage an authorization service 204. The authorization service 204 may send the request to a key service 206 (e.g., authorization key API) associated with the platform. A public private keypair may be generated. The key service 206 may store the public key. The private key may be sent to (e.g., and stored by) the authorization service 204 (e.g., or other device managed by the customer).

The authorization service 204 can issue (e.g., determine, generate, send) a token (e.g., a signed token) based on the private key. The token may comprise a JSON web token. The token may comprise a JSON web signature. The authorization service 204 may issue the signed token to potential users (e.g., content viewers) on a per user basis. The authorization service 204 may send the token to the user device 208 (e.g., for use by a viewer). The token may comprise an origin field. The authorization service 204 can add a valid origin domain to the origin field. The valid origin domain can indicate one or more domains that can be used to originate cross-origin requests to the stored content. For example, a user may access a customer's web page (e.g., myvideosite.com) and a select a content stream (e.g., or video stream, video file) for viewing. Selection of the content stream may cause generation of a request to the manifest service 210. The user device 208 may be caused (e.g., by a scripting language, computer executable code) to send the request to the manifest service 210.

The user device 208 may access a user interface associated with the authorization service 204. The user device 208 may receive the token as part of a sign in process of the user interface, upon receiving data indicating a request from the user for content, and/or the like. The user interface may provide access to a live streaming service. The live streaming service may comprise that service that provides end to end live streaming as a service. Content providers (e.g., broadcasters) may provide content, such as videos, live streams of individuals talking, playing a video game, shows, movies, live events, and/or other like. The content may be sent to and/or stored by the platform 202. The content may be accessed via a content service 212. The user interface may list the content provided by the content providers. The content may be listed by category, channel, and/or the like. If a user requests, at a user interface, to watch content (e.g., such as live stream) the user device 208 may send a request for a manifest to a manifest service 210. This request may comprise a token, such as a signed JWT, that the customer provided to the user device. The manifest service 210 may be configured to enforce cross-origin resource sharing (CORS) by confirming that the origin header in the request matches that of the signed token. The platform 202 may process (e.g., cryptographically process, decrypt, validate) the token using the public key corresponding to the customer's private key (e.g., the key that the customer used to sign the token). The platform 202 may process the token to determine the valid origin. If the origin header does not match the determined valid origin or the signature does not validate, the request is rejected. Thus, the system allows enforcing of CORS requests on the customer's domain. If the request is validated, the user device 208 may receive information (e.g., a manifest, index) for a accessing, via the content service 212, the requested content.

Figure 3:
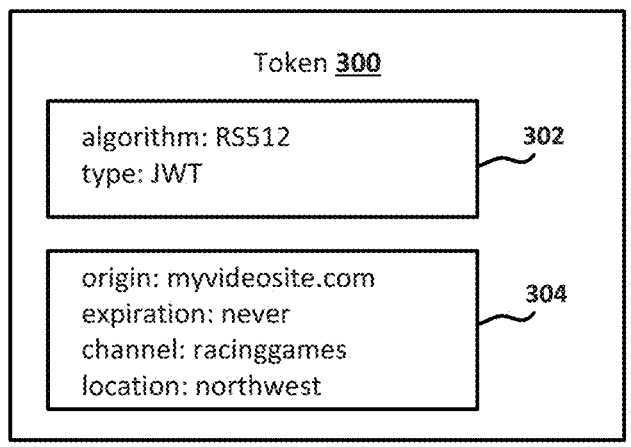
FIG. 3 is a diagram showing a representation of an example token.

FIG. 3 is a diagram showing a representation of an example token 300. The token may comprise a header 302. The header 302 may comprise an algorithm field indicating a cryptographic algorithm used to process (e.g., sign, encrypt) the token. The cryptographic algorithm may comprise an algorithm that supports public/private key pairs. The header 302 may comprise a type field indicating a type of token, a formatting used for the token, and/or the like.

The token 300 may comprise a payload 304. The payload 304 may comprise one or more data fields. The one or more data fields may be added to the token 300 by the authorization service 204. Which fields are added and/or the values of the fields may be determined based on context, such as information associated with a user, information associated with a channel, information associated with a user interface, information associated with a request, and/or the like. The payload 304 may comprise an origin field indicating a valid origin domain. The payload 304 may comprise an expiration field indicating expiration timing information. The payload 304 may comprise a channel field indicating a channel, such as a live streaming channel, content channel, and/or the like. The content channel may be specific to one broadcaster or to a plurality of broadcasting with different content streams. The payload 304 may comprise a location field indicating a location, such as a geographic location from which the content may be accessed. The payload 304 may comprise a content quality field indicating a content quality, such as high definition, standard definition, ultrahigh definition, 4 k, 1080p, 720p, 480p, and/or the like. The content quality may be indicative of whether user requesting content is authorized and/or capable of handling the content quality. The payload 304 may comprise a permissions field. The permissions field may be indicative of permission level, such as read, write, delete, create, and/or the like. The payload 304 may comprise a resource type field. The resource type field may indicate a type of resource, such as audio, video, file container type, document type (e.g., pdf, docx, rtf). It should be noted that the example values shown in FIG. 3 are used for purposes of illustration, and many other different values may be used.

The header 302 and/or payload 304 may be processed (e.g., upon receipt of the token and/or a request associated with the token). The manifest service 210 (e.g., or content service 212) may process the header 302 and/or payload 304 to validate and/or authorize a request for content. If a request is received from a location that does not match the location field, the request can be denied. The manifest service 210 (e.g., or content service 212) may process the header 302 and/or payload 304 to determine which information to send in response to a request. The information to send may comprise a different version of a manifest, a reduced manifest, an expanded manifest, and/or the like. If the token indicates that the content quality is standard definition, the manifest service 210 may determine a manifest associated with a standard definition version of the content. The manifest can then be sent to the user device requesting the content.

Figure 4:
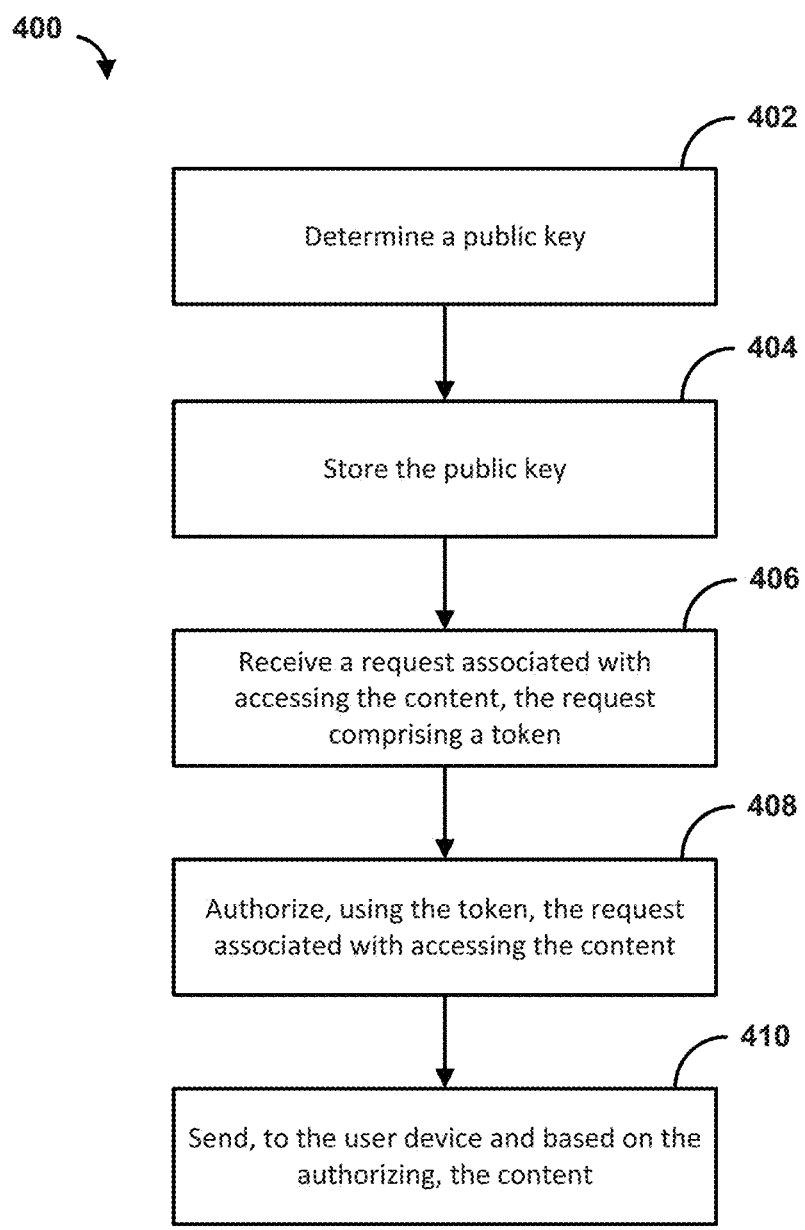
FIG. 4 is a flowchart showing an example method.

FIG. 4 is a flowchart showing an example method 400. The method 400 may comprise a computer implemented method for providing content. A system, such as the systems of FIGS. 1-2 may be configured to perform the method 400.

Operation 402 depicts determining a public key. The public key may be determined by one or more computing nodes (e.g., of the service platform 102 of FIG. 1, or platform 202 of FIG. 2). Determining the public key can comprise receiving a request comprising the public key. Determining the public key may comprise receiving a request for generation of a cryptographic key-pair. The request for generation of a cryptographic key-pair may be received by one or more computing nodes (e.g., of the service platform 102 of FIG. 1, or platform 202 of FIG. 2). The public key may be received on a message (e.g., or request) from a device. The request may be received from a device associated with a service that provides a user interface for accessing content. The service may be configured to control origin resource sharing (e.g., on a per user basis). The service may be configured to control origin resource sharing (e.g., on a per user basis) by providing tokens to users with corresponding valid origin domains. The one or more computing nodes may be configured to provide a content hosting service (e.g., video hosting service, image hosting service, document hosting service, content streaming service, gaming service) using a different domain than a domain hosting the user interface.

A private key and a public key may be generated. The private key and a public key may be generated based on the request. The private key and public key may be generated based on a cryptographic algorithm (e.g., an encryption algorithm). The public key may be used to process (e.g., decrypt, validate, cryptographically process) data processed (e.g., encrypted) using the private key.

The private key may be sent (e.g., by the one or more computing nodes). The private key may be sent based on the request to the device associated with the service. The private key may be sent to the device associated with the service that provides the user interface.

Operation 404 depicts storing the public key. The public key may be stored by the one or more computing nodes. The public key may be stored with a plurality of other keys generated for different customers. The public key may be accessible by device and/or service that authorizes requests for content, validates token using the public key, and/or the like. The public key may be associated with an account of the customer. The public key may be assigned to specific content, such as a subset of content associated with the account.

Operation 406 depicts receiving a request associated with accessing the content via the user interface. The request associated with accessing the content may be received from a user device by the one or more computing nodes. The request may be generated based on data indicating that a user selected the content. The request may be generating by computer executable code, such as a script (e.g., javascript, python, php), and/or the like. The user interface may comprise the computer executable code. The computer executable code may detect selection of the content, and trigger sending of the request based on the selection. The request may comprise an origin identifier (e.g., in an origin field not in the token). The origin identifier may comprise a domain hosting the user interface. The origin identifier may be stored in a header of the request.

The request associated with accessing the content may comprise a token. The token may be generated by the service that provides a user interface for accessing content. The token may comprise data indicative of a valid origin domain for accessing the content. At least a portion of the token may be processed (e.g., cryptographically processed, signed, cryptographically signed, encrypted) using the private key (e.g., which is associated with the public key). The token may be stored in a payload of the request. The token may comprise a JSON web token, and/or other token.

The request associated with accessing the content may comprise a request for a manifest associated with the content, a content segment, a content file, information for accessing the content, or a combination thereof. In some implementations, a manifest is not used to access the content. In such a case, the request can comprise a direct request for the content. For example, if the content is file (e.g., instead of a plurality of segments), the file can be requested directly.

Operation 408 depicts authorizing the request associated with accessing the content. The request associated with accessing the content may be authorized using the token. At least a portion of the token may be processed (e.g., decrypted, validated, cryptographically processed, cryptographically validated) using the public key. The at least a portion may comprise a signature of the token. The signature may be processed, cryptographically processed, verified, validated, decrypted, and/or the like using the public key. If processing the signature indicates that the signature is valid, the data indicative of the valid origin domain stored in the token may be determined (e.g., by accessing it). The at least a portion of the token that is processed (e.g., decrypted) may comprise the data indicative of the valid origin domain stored in the token. The request may be authorized based on comparing an origin identifier associated with the request to the data indicative of the valid origin domain stored in the token (e.g., after the data is validated and/or decrypted). The origin identifier may be determined from the header and compared to the data indicative of the valid origin. An identifier associated with the requested content may be included in the request. The identifier associated with the requested content may be used to determine a corresponding public key associated the content and/or an account associated with the content.

Operation 410 depicts sending the content. The content may be sent to the user device. The content may be sent to the user based on the authorizing (e.g., operation 412). A manifest file may be sent to the user device. The manifest file may identify a plurality of content segments and/or locations for accessing the content. The user device may use the manifest file to access the segments of content. In the case of a single file of content, the content may be sent to the user device (e.g., instead of a manifest).

Figure 5:
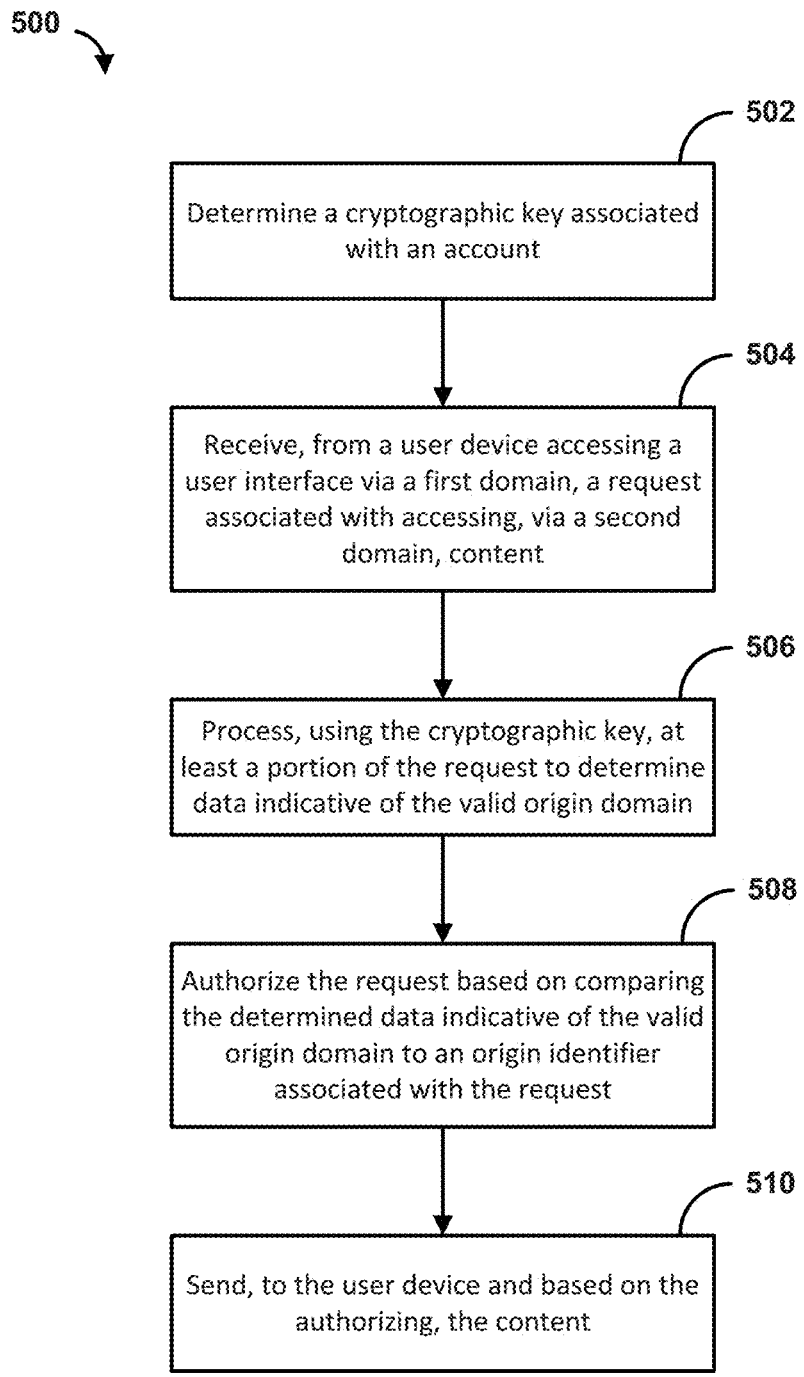
FIG. 5 is a flowchart showing an example method.

FIG. 5 is a flowchart showing another example method 500. The method 500 may comprise a computer implemented method for providing content. A system, such as the systems of FIGS. 1-2, may be configured to perform the method 500.

Operation 502 depicts determining a cryptographic key associated with an account. Determining the cryptographic key associated with the account may comprise generating a public key and a private key. A request for generation of the cryptographic key may be received (e.g., from a device associated with the account, by one or more computing nodes). The request for generation of the cryptographic key may be received via an application programming interface. The cryptographic key and an additional cryptographic key may be generated based on the request. The cryptographic key may comprise a public key. The additional cryptographic key may comprise a private key. The additional cryptographic key may be sent to the device associated with the account.

In some implementations, the cryptographic key (e.g., public key) may be provided (e.g., to the one or more computing nodes, to a content hosting service) from the device associated with the account. The device may determine (e.g., generate) a public key and a private key. The device may send (e.g., or upload to a user interface) the public key (e.g., the cryptographic key) to a key service. The cryptographic key may be validated by the key service. The device may send (e.g., or upload to a user interface) a known text that is signed with the private key. The key service may validate the public key by using it to validate the signature associated with the text. The key service may send a request (e.g., challenge request) for the device to prove that the public key is valid. In response to the request, the device may send (e.g., or upload) data signed with the private key.

Operation 504 depicts receiving a request associated with accessing content. The request may be associated with accessing, via a second domain, the content. The request associated with accessing content may be received from a user device accessing a user interface. At least a portion of the request may be processed (e.g., encrypted, signed) using the cryptographic key, the private key, and/or the like. The at least a portion of the request may comprise a signature used to sign the token. The at least a portion of the request may comprise data indicative of a valid origin domain for accessing the content. The request may comprise a cryptographic signature (e.g., an encrypted signature) and an unencrypted valid origin domain. The request may comprise an encrypted valid origin domain.

The request may be one or more of received with a token or may comprise the token. The token may comprise the processed at least the portion of the request. The token may be an encrypted token, a cryptographically signed token, a cryptographically secure token, or a combination thereof. The token may be generated by one or more devices associated with the account and by determining the data indicative of the valid origin domain. The token may be one of a plurality of tokens generated on a per user basis by one or more devices associated with the account. The token may be signed using a private key associated with the cryptographic key.

The data indicative of the valid origin domain may be determined by one or more devices associated with the account. The data indicative of the valid origin domain may be determined based on one or more rules managed by an entity associated with the account.

Operation 506 depicts processing (e.g., decrypting, validating, using the cryptographic key) the at least the portion of the request to determine the data indicative of the valid origin domain. The signature may be processed (e.g., decrypted, cryptographically processed) to validate the request and/or token. If the request and/or token is valid, the data indicative of the valid origin domain may be accessed as a data field of the request and/or token. If the data indicative of the valid origin domain is encrypted, then the data indicative of the valid origin domain may be decrypted (e.g., using the cryptographic key, the public key).

Operation 508 depicts authorizing the request. The request may be authorized based on comparing the determined data indicative of the valid origin domain to an origin identifier associated with the request. The origin identifier may be determined from a header, header field, and/or other data field of the request. If the determined data indicative of the valid origin domain at least partially matches the origin identifier, then the request can be authorized. Partial matching may comprise, for example, an indication of a domain (e.g., *.domain.com, where * indicates any value) in the determined data matching a domain (e.g., video. domain.com) in the origin identifier.

Operation 510 depicts sending the content. The content may be sent to the user device. The content may be sent based on the authorizing. The content may comprise one or more of video, images, documents, audio, streaming media, an application or code. The content may be stored by one or more computing nodes (e.g., a services platform) configured to host content as a service for a plurality of accounts. The user interface (e.g., associated with the request for content) may be managed by a separate entity than an entity that manages the platform.

An additional request may be received. The additional request may be associated with an additional user interface accessed via third domain. The additional request may be received from an additional user device. The additional request may be authorized using additional processed (e.g., encrypted, cryptographically processed) data. The additional processed data may comprise an additional valid origin domain. The additional valid origin domain may be encrypted, stored in a cryptographically secure data structure, stored in a cryptographically processed (e.g., signed, encrypted) data structure, and/or the like. The additional valid origin domain may be different than the valid origin domain.

Figure 6:
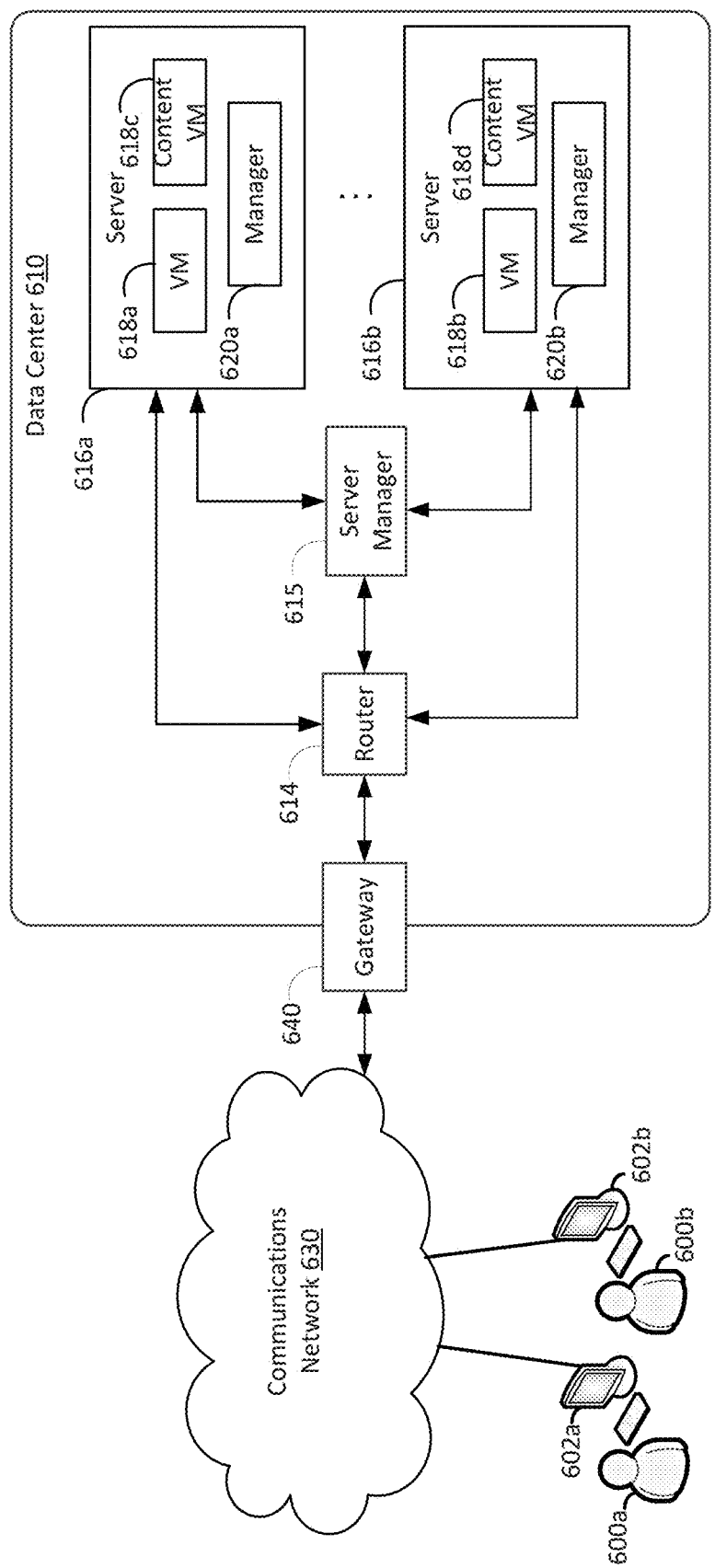
FIG. 6 is a diagram illustrating an example computing system that may be used in some embodiments.

As set forth above, a content provider may provide content to a destination over a network such as the Internet. Content may, in some cases, be provided upon request to a destination using, for example, streaming content delivery techniques. An example computing environment that enables providing of information to a destination will now be described in detail. In particular, FIG. 6 illustrates an example computing environment in which the embodiments described herein may be implemented. FIG. 6 is a diagram schematically illustrating an example of a data center 610 that can provide computing resources to users 600*a* and 600*b* (which may be referred herein singularly as user 600 or in the plural as users 600) via user computers 602*a* and 602*b* (which may be referred herein singularly as computer 602 or in the plural as computers 602) via a communications network 630. Data center 610 may be configured to provide computing resources for executing applications on a permanent or an as-needed basis. The computing resources provided by data center 610 may include various types of resources, such as gateway resources, load balancing resources, routing resources, networking resources, computing resources, volatile and non-volatile memory resources, content delivery resources, data processing resources, data storage resources, data communication resources, and the like. Each type of computing resource may be general-purpose or may be available in a number of specific configurations. For example, data processing resources may be available as virtual machine instances that may be configured to provide various web services. In addition, combinations of resources may be made available via a network and may be configured as one or more web services. The instances may be configured to execute applications, including web services, such as application services, media services, database services, processing services, gateway services, storage services, routing services, security services, encryption services, load balancing services, application services and the like. These web services may be configurable with set or custom applications and may be configurable in size, execution, cost, latency, type, duration, accessibility, and in any other dimension. These web services may be configured as available infrastructure for one or more clients and can include one or more applications configured as a platform or as software for one or more clients. These web services may be made available via one or more communications protocols. These communications protocols may include, for example, hypertext transfer protocol (HTTP) or non-HTTP protocols. These communications protocols may also include, for example, more reliable transport layer protocols such as transmission control protocol (TCP) and less reliable transport layer protocols such as user datagram protocol (UDP). Data storage resources may include file storage devices, block storage devices and the like.

Each type or configuration of computing resource may be available in different sizes, such as large resources—consisting of many processors, large amounts of memory and/or large storage capacity—and small resources—consisting of fewer processors, smaller amounts of memory and/or smaller storage capacity. Customers may choose to allocate a number of small processing resources as web servers and/or one large processing resource as a database server, for example.

Data center 610 may include servers 616*a-b* (which may be referred herein singularly as server 616 or in the plural as servers 616) that provide computing resources. These resources may be available as bare metal resources, or as virtual machine instances 618*a-d* and (which may be referred herein singularly as virtual machine instance 618 or in the plural as virtual machine instances 618). Virtual machine instances 618*c* and 618*d* are content server virtual machine instances. The content virtual machine instances 618*c* and 618*d* may be configured to perform all or any portion of storing content, providing content, validating content requests, live streaming content, and/or the like as described herein. As should be appreciated, while the particular example illustrated in FIG. 6 includes one content virtual machine in each server, this is merely an example. A server may include more than one content virtual machine or may not include any content virtual machines.

The availability of virtualization technologies for computing hardware has provided benefits for providing large scale computing resources for customers and allowing computing resources to be efficiently and securely shared between multiple customers. For example, virtualization technologies may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 6, communications network 630 may, for example, be a publicly accessible network of linked networks and possibly operated by various distinct parties, such as the Internet. In other embodiments, communications network 630 may be a private network, such as, a corporate or university network that is wholly or partially inaccessible to non-privileged users. In still other embodiments, communications network 630 may include one or more private networks with access to and/or from the Internet.

Communication network 630 may provide access to computers 602. User computers 602 may be computers utilized by users 600 or other customers of data center 610. For instance, user computer 602a or 602b may be a server, a desktop or laptop personal computer, a tablet computer, a wireless telephone, a personal digital assistant (PDA), an e-book reader, a game console, a set-top box or any other computing device capable of accessing data center 610. User computer 602a or 602b may connect directly to the Internet (e.g., via a cable modem or a Digital Subscriber Line (DSL)). Although only two user computers 602a and 602b are depicted, it should be appreciated that there may be multiple user computers.

User computers 602 may also be utilized to configure aspects of the computing resources provided by data center 610. In this regard, data center 610 might provide a gateway or web interface through which aspects of its operation may be configured through the use of a web browser application program executing on user computer 602. Alternately, a stand-alone application program executing on user computer 602 might access an application programming interface (API) exposed by data center 610 for performing the configuration operations. Other mechanisms for configuring the operation of various web services available at data center 610 might also be utilized.

Servers 616 shown in FIG. 6 may be standard servers configured appropriately for providing the computing resources described above and may provide computing resources for executing one or more web services and/or applications. In one embodiment, the computing resources may be virtual machine instances 618. In the example of virtual machine instances, each of the servers 616 may be configured to execute an instance manager 620a or 620b (which may be referred herein singularly as instance manager 620 or in the plural as instance managers 620) capable of executing the virtual machine instances 618. The instance managers 620 may be a virtual machine monitor (VMM) or another type of program configured to enable the execution of virtual machine instances 618 on server 616, for example. As discussed above, each of the virtual machine instances 618 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 610 shown in FIG. 6, a router 614 may be utilized to interconnect the servers 616a and 616b. Router 614 may also be connected to gateway 640, which is connected to communications network 630. Router 614 may be connected to one or more load balancers, and alone or in combination may manage communications within networks in data center 610, for example by forwarding packets or other data communications as appropriate based on characteristics of such communications (e.g., header information including source and/or destination addresses, protocol identifiers, size, processing requirements, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

In the example data center 610 shown in FIG. 6, a server manager 615 is also employed to at least in part direct various communications to, from and/or between servers 616a and 616b. While FIG. 6 depicts router 614 positioned between gateway 640 and server manager 615, this is merely an exemplary configuration. In some cases, for example, server manager 615 may be positioned between gateway 640 and router 614. Server manager 615 may, in some cases, examine portions of incoming communications from user computers 602 to determine one or more appropriate servers 616 to receive and/or process the incoming communications. Server manager 615 may determine appropriate servers to receive and/or process the incoming communications based on factors such as an identity, location or other attributes associated with user computers 602, a nature of a task with which the communications are associated, a priority of a task with which the communications are associated, a duration of a task with which the communications are associated, a size and/or estimated resource usage of a task with which the communications are associated and many other factors. Server manager 615 may, for example, collect or otherwise have access to state information and other information associated with various tasks in order to, for example, assist in managing communications and other operations associated with such tasks.

It should be appreciated that the network topology illustrated in FIG. 6 has been greatly simplified and that many more networks and networking devices may be utilized to interconnect the various computing systems disclosed herein. These network topologies and devices should be apparent to those skilled in the art.

It should also be appreciated that data center 610 described in FIG. 6 is merely illustrative and that other implementations might be utilized. Additionally, it should be appreciated that the functionality disclosed herein might be implemented in software, hardware or a combination of software and hardware. Other implementations should be apparent to those skilled in the art. It should also be appreciated that a server, gateway or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders) and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

Figure 7:
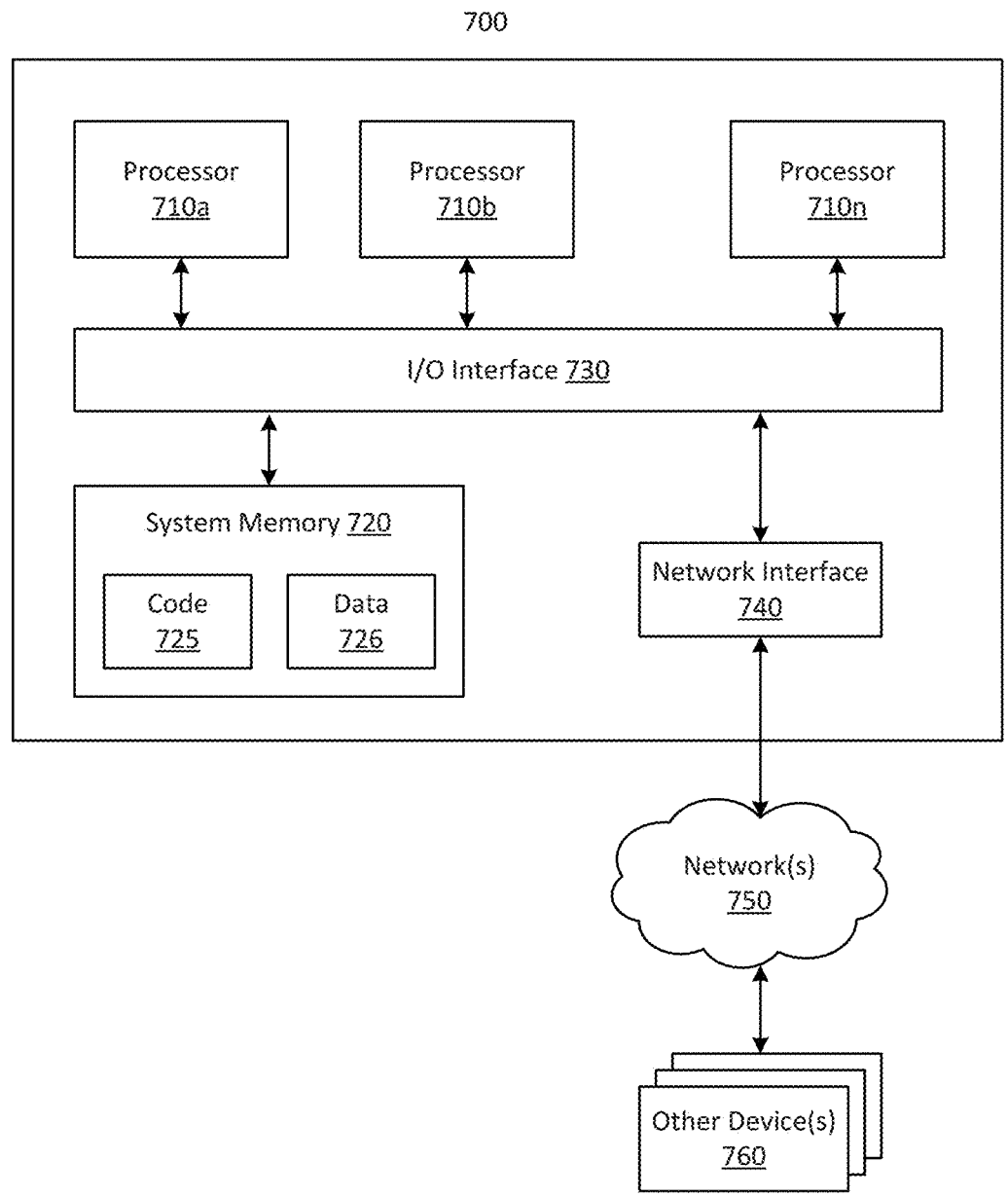
FIG. 7 is a diagram illustrating an example computing system that may be used in some embodiments.

In at least some embodiments, a server that implements a portion or all of one or more of the technologies described herein may include a general-purpose computer system that includes or is configured to access one or more computer-accessible media. FIG. 7 depicts a general-purpose computer system that includes or is configured to access one or more computer-accessible media. In the illustrated embodiment, computing device 700 includes one or more processors 710a, 710b and/or 710n (which may be referred herein singularly as "a processor 710" or in the plural as "the processors 710") coupled to a system memory 720 via an input/output (I/O) interface 730. Computing device 7100 further includes a network interface 740 coupled to I/O interface 730.

In various embodiments, computing device 700 may be a uniprocessor system including one processor 710 or a multiprocessor system including several processors 710 (e.g., two, four, eight or another suitable number). Processors 710 may be any suitable processors capable of executing instructions. For example, in various embodiments, processors 710 may be general-purpose or embedded processors implementing any of a variety of instruction set architectures (ISAs), such as the x86, PowerPC, SPARC or MIPS ISAs or any other suitable ISA. In multiprocessor systems, each of processors 710 may commonly, but not necessarily, implement the same ISA.

System memory 720 may be configured to store instructions and data accessible by processor(s) 710. In various embodiments, system memory 720 may be implemented using any suitable memory technology, such as static random access memory (SRAM), synchronous dynamic RAM (SDRAM), nonvolatile/Flash®-type memory or any other type of memory. In the illustrated embodiment, program instructions and data implementing one or more desired functions, such as those methods, techniques and data described above, are shown stored within system memory 720 as code 725 and data 726.

In one embodiment, I/O interface 730 may be configured to coordinate I/O traffic between processor 710, system memory 720 and any peripherals in the device, including network interface 740 or other peripheral interfaces. In some embodiments, I/O interface 730 may perform any necessary protocol, timing or other data transformations to convert data signals from one component (e.g., system memory 720) into a format suitable for use by another component (e.g., processor 710). In some embodiments, I/O interface 730 may include support for devices attached through various types of peripheral buses, such as a variant of the Peripheral Component Interconnect (PCI) bus standard or the Universal Serial Bus (USB) standard, for example. In some embodiments, the function of I/O interface 730 may be split into two or more separate components, such as a north bridge and a south bridge, for example. Also, in some embodiments some or all of the functionality of I/O interface 730, such as an interface to system memory 720, may be incorporated directly into processor 710.

Network interface 740 may be configured to allow data to be exchanged between computing device 700 and other device or devices 760 attached to a network or networks 750, such as other computer systems or devices, for example. In various embodiments, network interface 740 may support communication via any suitable wired or wireless general data networks, such as types of Ethernet networks, for example. Additionally, network interface 40 may support communication via telecommunications/telephony networks such as analog voice networks or digital fiber communications networks, via storage area networks such as Fibre Channel SANs (storage area networks) or via any other suitable type of network and/or protocol.

In some embodiments, system memory 720 may be one embodiment of a computer-accessible medium configured to store program instructions and data as described above for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media such as magnetic or optical media, e.g., disk or DVD/CD coupled to computing device 700 via I/O interface 70. A non-transitory computer-accessible storage medium may also include any volatile or non-volatile media such as RAM (e.g. SDRAM, DDR SDRAM, RDRAM, SRAM, etc.), ROM (read only memory) etc., that may be included in some embodiments of computing device 700 as system memory 70 or another type of memory. Further, a computer-accessible medium may include transmission media or signals such as electrical, electromagnetic or digital signals conveyed via a communication medium such as a network and/or a wireless link, such as those that may be implemented via network interface 70. Portions or all of multiple computing devices such as those illustrated in FIG. 6 may be used to implement the described functionality in various embodiments; for example, software components running on a variety of different devices and servers may collaborate to provide the functionality. In some embodiments, portions of the described functionality may be implemented using storage devices, network devices or special-purpose computer systems, in addition to or instead of being implemented using general-purpose computer systems. The term "computing device," as used herein, refers to at least all these types of devices and is not limited to these types of devices.

A compute node, which may be referred to also as a computing node, may be implemented on a wide variety of computing environments, such as commodity-hardware computers, virtual machines, web services, computing clusters and computing appliances. Any of these computing devices or environments may, for convenience, be described as compute nodes.

A network set up by an entity such as a company or a public sector organization to provide one or more web services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and web services offered by the provider network. The resources may in some embodiments be offered to clients in various units related to the web service, such as an amount of storage for storage, processing capability for processing, as instances, as sets of related services and the like. A virtual computing instance may, for example, comprise one or more servers with a specified computational capacity (which may be specified by indicating the type and number of CPUs, the main memory size and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special-purpose operating systems, platforms that support various interpreted or compiled programming languages such as Ruby, Perl, Python, C, C++ and the like or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage and/or other network-accessible functionality may allow customers to reserve or purchase access to resources in various resource acquisition modes. The computing resource provider may provide facilities for customers to select and launch the desired computing resources, deploy application components to the computing resources and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server or some combination of the two. Various types and configurations of instances may be made available, including different sizes of resources executing different operating systems (OS) and/or hypervisors, and with various installed software applications, runtimes and the like. Instances may further be available in specific availability zones, representing a logical region, a fault tolerant region, a data center or other geographic location of the underlying computing hardware, for example. Instances may be copied within an availability zone or across availability zones to improve the redundancy of the instance, and instances may be migrated within a particular availability zone or across availability zones. As one example, the latency for client communications with a particular server in an availability zone may be less than the latency for client communications with a different server. As such, an instance may be migrated from the higher latency server to the lower latency server to improve the overall client experience.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations inexpensive and low latency network connectivity may be provided between resource instances that reside within the same geographical region (and network transmissions between resources of the same availability zone may be even faster).

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain methods or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network or a portable media article to be read by an appropriate drive or via an appropriate connection. The systems, modules and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal, or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations and so forth. Also, the term "or" is used in its inclusive sense (and not in its exclusive sense) so that when used, for example, to connect a list of elements, the term "or" means one, some or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module or block is necessary or indispensable. Indeed, the novel methods and systems described herein may be embodied in a variety of other forms; furthermore, various omissions, substitutions and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer implemented method for providing content, the method comprising:
    determining, by one or more computing nodes and based on a message from a device, a public key, wherein the device is associated with a service that provides a user interface for accessing content;
    storing, by the one or more computing nodes, the public key;
    receiving, from a user device by the one or more computing nodes, a request associated with accessing the content via the user interface, wherein the request comprises a token generated by the service and comprising data indicative of a valid origin domain for accessing the content, and wherein at least a portion of the token is processed using a private key associated with the public key;
    authorizing, using the token, the request associated with accessing the content, wherein the request is authorized based on processing at least the portion of the token using the public key and comparing an origin identifier associated with the request to the data indicative of the valid origin domain stored in the token; and
    sending, to the user device and based on the authorizing, the content, wherein the service is configured to control origin resource sharing on a per user basis by providing tokens to users with corresponding valid origin domains, and wherein the one or more computing nodes are configured to provide a video hosting service using a different domain than a domain hosting the user interface.

2. The method of claim 1, wherein the request associated with accessing the content comprises a request for a manifest associated with the content.

3. A system for providing content, the system comprising one or more memories having instructions thereon that, upon execution, at least cause the system to:
    determine a cryptographic key associated with an account;
    receive, from a user device accessing a user interface via a first domain, a request associated with accessing, via a second domain, content, wherein the request comprises data indicative of a valid origin domain for accessing the content, and wherein the request comprises a token, and wherein the token is generated by one or more devices associated with the account;
    process, using the cryptographic key, at least the portion of the token to determine the data indicative of the valid origin domain;
    authorize the request based on comparing the determined data indicative of the valid origin domain to an origin identifier associated with the request;
    send, to the user device and based on the authorizing, the content wherein the one or more devices are configured to control origin resource sharing on a per user basis by providing tokens to users with corresponding valid origin domains, and
    provide a video hosting service using a different domain than a domain hosting the user interface.

4. The system of claim 3, wherein the system is configured to determine the cryptographic key associated with the account by generating a public key and a private key in response to a request from a device associated with the account.

5. The system of claim 3, wherein the token is one of a plurality of tokens generated on a per user basis by one or more devices associated with the account.

6. The system of claim 3, wherein the token comprises a signature generated using a private key associated with the cryptographic key, and wherein processing the at least the portion of the request comprises using the cryptographic key to validate the signature.

7. The system of claim 3, wherein the data indicative of the valid origin domain is determined by one or more devices associated with the account and based on one or more rules managed by an entity associated with the account.

8. The system of claim 3, wherein the instructions, upon execution, further cause the system to:
    receive, via an application programming interface and from a device associated with the account, a request for generation of the cryptographic key;
    generate, based on the request, the cryptographic key and an additional cryptographic key, wherein the cryptographic key comprises a public key and the additional cryptographic key comprises a private key; and
    send, to the device associated with the account, the additional cryptographic key.

9. The system of claim 3, wherein the instructions, upon execution, further cause the system to:
- receive, from an additional user device, an additional request associated with an additional user interface accessed via third domain; and
- authorize, using additional cryptographically processed data comprising an additional valid origin domain, the additional request.

10. The system of claim 3, wherein the content comprises one or more of video, images, documents, audio, streaming media, an application or code.

11. The system of claim 3, wherein the content is stored by a platform configured to host content as a service for a plurality of accounts, and wherein the user interface is managed by a separate entity than an entity that manages the platform.

12. A non-transitory computer-readable storage medium having stored thereon computer-readable instructions, the computer-readable instructions comprising instructions that, upon execution on one or more computing devices, at least cause:
- determining a cryptographic key associated with an account;
- receiving, from a user device accessing a user interface via a first domain, a request associated with accessing, via a second domain, content, wherein the request comprises data indicative of a valid origin domain for accessing the content;
- processing, using the cryptographic key, at least a portion of the request to determine the data indicative of the valid origin domain, authorizing the request based on comparing the determined data indicative of the valid origin domain to an origin identifier associated with the request;
- sending, to the user device and based on the authorizing, the content wherein the one or more devices are configured to control origin resource sharing on a per user basis by providing the data to users with corresponding valid origin domains, and
- provide a video hosting service using a different domain than a domain hosting the user interface.

13. The computer-readable storage medium of claim 12, wherein determining the cryptographic key associated with the account comprises generating a public key and a private key in response to a request from a device associated with the account.

14. The computer-readable storage medium of claim 12, wherein the request is one or more of received with a token or comprises the token, and wherein the token is generated by one or more devices associated with the account and by determining the data indicative or the valid origin domain.

15. The computer-readable storage medium of claim 12, wherein the data indicative of the valid origin domain is determined by one or more devices associated with the account and based on one or more rules managed by an entity associated with the account.

16. The computer-readable storage medium of claim 12, wherein instructions that, upon execution on one or more computing devices, at least cause:
- receiving, via an application programming interface and from a device associated with the account, a request for generation of the cryptographic key;
- generating, based on the request, the cryptographic key and an additional cryptographic key, wherein the cryptographic key comprises a public key and the additional cryptographic key comprises a private key; and
- sending, to the device associated with the account, the additional cryptographic key.

17. The computer-readable storage medium of claim 12, wherein the content is stored by a platform configured to host content as a service for a plurality of accounts, and wherein the user interface is managed by a separate entity than an entity that manages the platform.

* * * * *